United States Patent [19]

Wallace

[11] Patent Number: 5,415,679
[45] Date of Patent: May 16, 1995

[54] METHODS AND APPARATUS FOR FORMING MICRODROPLETS OF LIQUIDS AT ELEVATED TEMPERATURES

[75] Inventor: David B. Wallace, Dallas, Tex.

[73] Assignee: MicroFab Technologies, Inc., Plano, Tex.

[21] Appl. No.: 262,700

[22] Filed: Jun. 20, 1994

[51] Int. Cl.[6] .............................................. B22D 39/00
[52] U.S. Cl. ...................................... 75/331; 222/590; 222/593; 266/239
[58] Field of Search .................. 222/590, 593; 75/331; 266/202, 236, 239

[56] References Cited

U.S. PATENT DOCUMENTS

| | | | |
|---|---|---|---|
| 3,833,163 | 9/1974 | Denslow et al. | 228/1 |
| 4,435,666 | 3/1984 | Fukui et al. | 310/328 |
| 4,828,886 | 5/1989 | Heiber | 222/593 |
| 5,193,738 | 3/1993 | Hayes | 228/180.2 |
| 5,229,016 | 7/1993 | Hayes et al. | 222/590 |

*Primary Examiner*—Scott Kastler
*Attorney, Agent, or Firm*—Jack A. Kanz

[57] ABSTRACT

Microdroplets of liquids at elevated temperatures are formed by transferring the liquid to an electrostrictive ejection device and applying an electric field which induces a second order elastic strain in the ejection device. The ejection device responds by ejecting generally spherically-shaped microdroplets. The ejection device comprises an electrostrictive transducer having an orifice through which the liquid is ejected. Drive electronics apply an excitation electric field to the electrostrictive transducer which causes a second order elastic strain in the electrostrictive transducer independent of the polarity of the electric field.

15 Claims, 4 Drawing Sheets

METHODS AND APPARATUS FOR FORMING MICRODROPLETS OF LIQUIDS AT ELEVATED TEMPERATURES

This invention relates to methods and apparatus for dispensing phase change liquids such as wax and liquid metals in the form of microdroplets. More particularly, it relates to electrostrictive transducer devices for forming and dispensing microdroplets of liquids at elevated temperatures and methods of using such devices.

Formation and dispensing of microdroplets of liquids have been found quite useful in many applications such as ink-jet printing and precision dispensing of chemicals and pharmaceuticals. More recently, the basic technology has been revised and improved to provide accurate placement of solder. This invention is particularly applicable to dispensing very small and precise amounts of numerous and various types of liquids at elevated temperatures, thus is particularly useful for dispensing liquid metal used for solder. Accordingly, solder applications are discussed herein in detail. However, it should be recognized that the invention is not so limited.

Soldering is extensively used in circuit board assemblies and electronic devices to provide electrical interconnections and to bond components together. With the trend in electronics packaging and circuitry assemblies toward miniaturization (resulting in smaller leads and connectors) the number of interconnections increases. As device package sizes decrease and the number of input/output leads increases, the size of individual leads and spacing therebetween must be reduced, leading to difficulties in positioning and securing the leads on mounting pads on the surfaces of circuit boards and the like.

It is highly desirable to employ ink-jet technology to provide less expensive and more accurate ways of depositing microdroplets of solder on circuit boards, electronic device packages, semiconductor chips and the like. Application of molten solder droplets using ink-jet technology is disclosed, for example, in IBM Technical Disclosure Bulletin, Vol.14, No. 8, January 1972, pp. 2352–2355; Hieber, U.S. Pat. No. 4,828,886; Hayes, U.S. Pat. No. 5,193,738; and Hayes, et al., U.S. Pat. No. 5,229,016.

The Hieber, Hayes and Hayes, et al. patents disclose piezoelectric transducers as means for propelling droplets from a dispensing device or as means for creating a disturbance which causes a pressurized stream of molten solder to break into droplets. However, piezoelectric materials have limitations. For example, the temperatures required for forming molten solder balls range from approximately 150° C. to approximately 350° C. Operation at these temperatures can cause the piezoelectric characteristics of most high output piezoelectric materials to change since these temperatures are close to the Curie temperatures of such materials.

Conventional piezoelectric materials are not well-suited for operating at high temperatures because (1) near the Curie temperature of a given piezoelectric material, the properties of the material change drastically and (2) at temperatures well below the Curie temperature, normal aging processes characteristic of piezoelectric materials are accelerated drastically. The most serious form of aging is a gradual decrease in the piezoelectric properties typical of piezoelectric materials after poling. Such aging effectively limits the use of any particular piezoelectric material to about 100°–200° C. below its Curie temperature. Unfortunately, many otherwise desireable piezoelectric materials have low Curie temperatures in order to increase their piezoelectric properties.

As illustrated in FIGS. 1 and 2, surface mountable packages such as microelectronic device package 10 (a semiconductor integrated circuit chip or the like) is operatively joined to a substrate such as a printed circuit board or other device 12 by a solder reflow process. The interconnection material between the microelectronic device package 10 and the substrate or device 12 is a solder bump, drop or ball in the form of a deposit 14 formed prior to the solder reflow process. Microelectronic device 10 (the upside-down chip or "flip chip") is then inverted (see FIG. 2) and the solder bumps 14 aligned with the matching footprint of solder-wettable terminals, contact pads or bond pads 18 on the substrate 12. Heat is then applied and all joints or interconnections between the wettable metal pads 16 on the microelectronic device 10 and the solder-wettable terminals, contact pads or bond pads 18 on the substrate 12 are bonded simultaneously by reflowing the solder in the solder bumps or drops 14. Typically, such interconnections are made with solder bumps 14 which are about one hundred (100) to about one hundred fifty (150) $\mu$m in diameter with several hundred to several thousand solder bumps per chip. Manufacturing processes, however, are moving toward more interconnections per chip and thus require even smaller solder bumps. Since the interconnections are closer together, greater accuracy in placement of the solder bumps is also required.

As disclosed in Hayes U.S. Pat. Nos. 5,193,738 and Hayes, et al. 5,229,016 ejection devices employing piezoelectric transducers can dispense molten solder droplets quickly and accurately. However, at the elevated temperatures associated with molten solder, aging and depoling effects may seriously limit the use of many, if not all, piezoelectric materials. Alternative methods and apparatus which eliminate such limitations are thus highly desirable.

In accordance with the present invention, apparatus for forming and dispensing microdroplets of hot liquid such as molten solder is provided using a microdroplet ejection device which operates at elevated temperatures without depoling or accelerated aging. The ejection device is a transducer of electrostrictive material exhibiting a second order elastic strain response which is independent of polarity of the applied electric field. Typical apparatus for forming balls or microdroplets of solder may, for example, comprise a holding reservoir for liquid solder; an ejection device in communication with the reservoir to eject generally spherically-shaped microdroplets of molten solder; and an excitation voltage source to cause the ejection device to deform and eject a ball or droplet of molten solder.

Forming microdroplets of solder in accordance with the present invention may include the steps of maintaining the solder in liquid state in a reservoir; transferring the molten solder to an ejection chamber having an ejection device; using an electrostrictive transducer with an aperture as the ejection device; maintaining the solder liquid while in the ejection chamber and applying an electric field to the electrostrictive transducer to eject generally spherically-shaped microdroplets of molten solder in response to the applied field. Varying the volume and/or number of liquid solder droplets may be accomplished by varying the magnitude of the applied voltage or by varying the size of the orifice in the ejection device. Since electrostrictive materials can be tailored to operate at any desired temperature within a wide range of temperatures and will not suffer the effects of aging and depoling common to piezoelectric transducers, electrostrictive transducers can be used as ejection devices for molten materials over a wide range of elevated temperatures. Other features and advantages of the invention will become more readily understood from the following detailed description taken in connection with the appended claims and attached drawing, wherein like reference numerals have been applied to like elements, in which:

Figure 1:
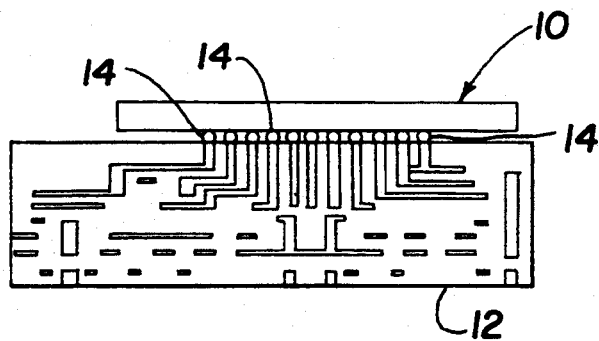
FIG. 1 is a simplified pictorial illustration of an integrated circuit chip soldered to a substrate.
Figure 2:
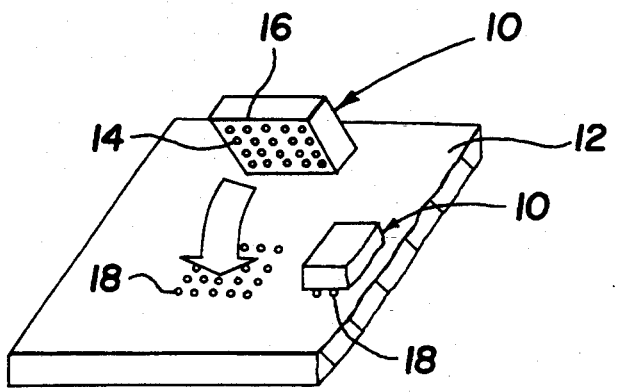
FIG. 2 is a simplified pictorial illustration of one step in the process of soldering an integrated circuit chip to a substrate.
Figure 3:
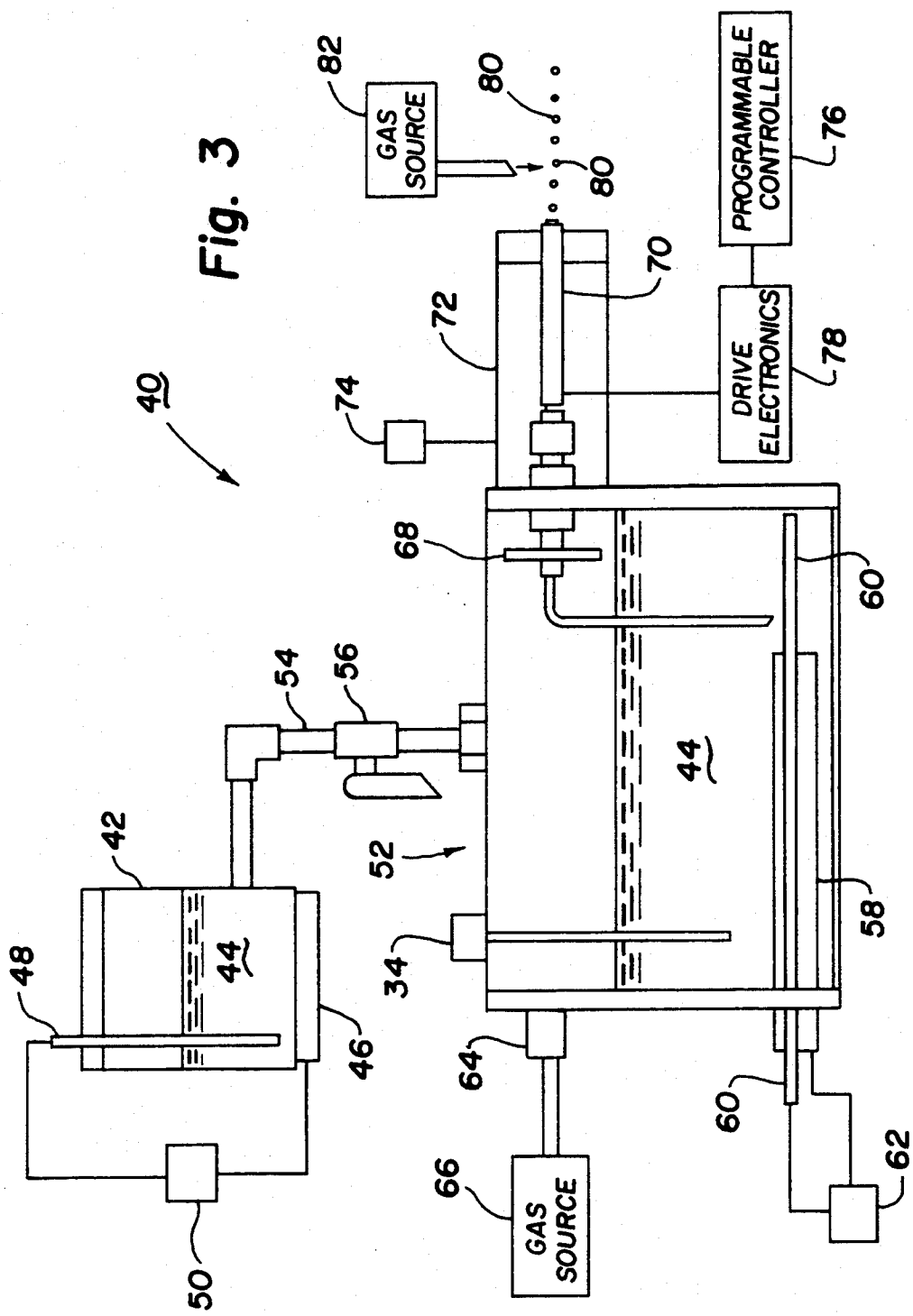
FIG. 3 is a schematic illustration of apparatus employing the preferred embodiment of the invention to dispense molten solder microdroplets.

Apparatus employing a presently preferred embodiment of the invention is shown in FIG. 3 and generally designated by the reference character 40. The apparatus illustrated and described is capable of producing spherically-shaped bodies of liquid solder by ejecting controlled amounts of liquid in the form of microdroplets. The volume of each microdroplet may be varied as desired. The spherically-shaped bodies may be projected with great accuracy and precision to very small soldering areas or surfaces (such as wettable metal contact pads on integrated circuit chips and contact or bond pads on packaging substrates) to produce any desired pattern of solder bumps or drops of various shapes and heights directly on the desired target with extreme accuracy.

As illustrated, solder-ejecting apparatus 40 comprises a holding reservoir 42 for initially receiving and holding liquid solder 44. Heating element 46 is operatively positioned in holding reservoir 42 and controlled by thermocouple 48 and power source 50 to heat the solder 44 and maintain it at the required temperature.

An ejection chamber 52 is connected to the outlet of reservoir 42 through conduit 54 and valve 56 which allows liquid solder 44 to flow from the reservoir 42 into ejection chamber 52. Oxides and impurities tend to stay at the top of the liquid solder 44 in the reservoir 42 and do not enter the ejection chamber 52. Heating element 58 is operatively positioned in ejection chamber 52 and controlled by thermocouple 60 and power source 62 to maintain the liquid solder 44 at the required temperature. For a charge-and-deflection device, ejection chamber 52 is pressurized through inlet 64 by an inert gas such as argon from gas source 66. The pressurized gas forces liquid solder 44 through filter 68 into the ejection device 70 to purge the system in preparation for operation. When ejection device 70 is a drop-on-demand device, the ejection chamber 52 is not pressurized during operation. However, the space above the liquid solder 44 is filled with relatively inert gas to eliminate oxygen from the chamber.

Heater 72, operatively connected to power source 74, surrounds the ejection device 70 and controls the temperature of the liquid solder 44 within the ejection device 70. Ejection device 70 is a transducer with a channel or bore extending therethrough which converts an applied electric field to a mechanical strain in the ejection device 70. Programmable controller 76 provides activating signals to drive electronics 78 and causes drive electronics 78 to apply a drive excitation voltage to induce an excitation electric field in the transducer 70.

Figure 4:
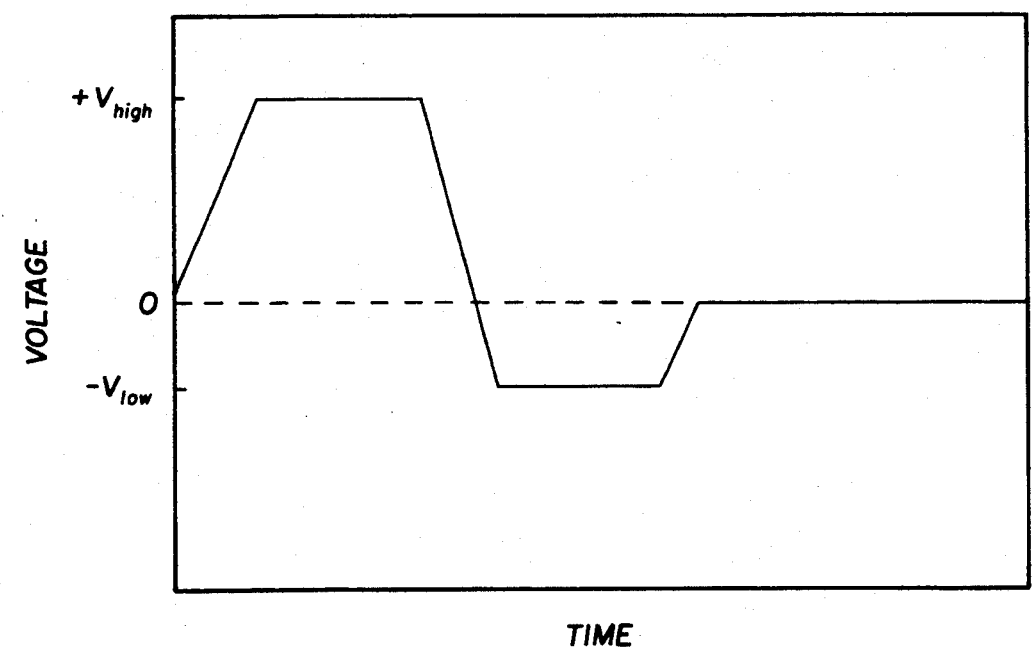
FIG. 4 is a graphic illustration of a voltage drive waveform used to control an electrostrictive transducer in accordance with the invention.
Figure 6:
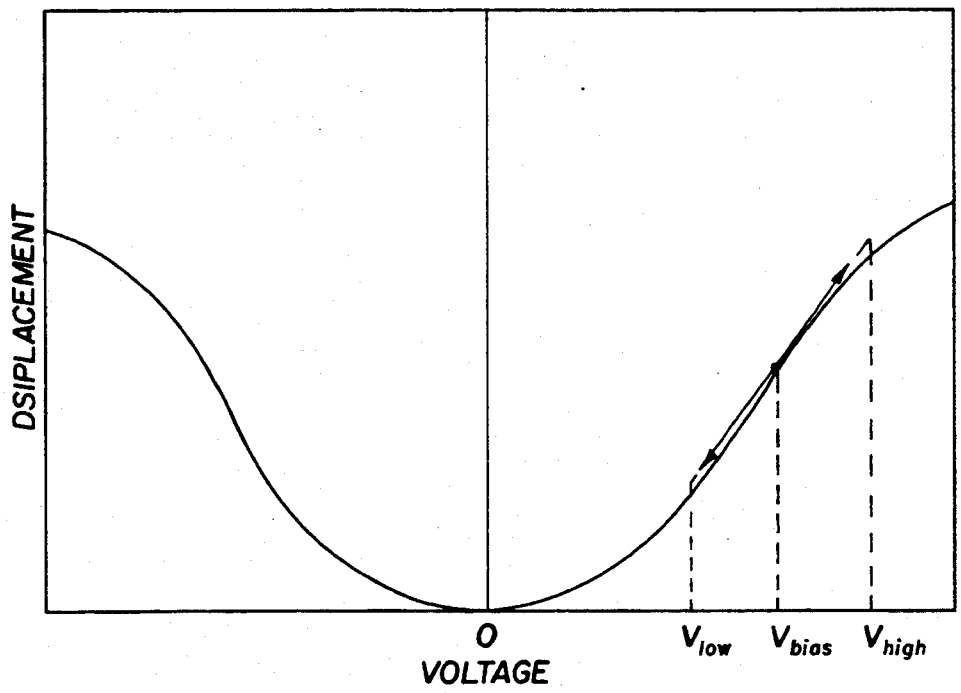
FIG. 6 is a graphic illustration of a typical displacement/voltage characteristic curve of an electrostrictive transducer.

In accordance with the invention, transducer 70 is formed of electrostrictive material. Electrostrictive materials are designed to operate at or near their Curie temperatures and such temperatures are generally higher than the Curie temperatures of piezoelectric materials. Thus electrostrictive materials may operate at substantially higher temperatures than piezoelectric materials. For purposes of this disclosure, elevated temperatures are considered those temperatures which are greater than about 100° C. A typical drive voltage waveform is illustrated in FIG. 4 wherein the applied voltage varies from a positive $V_{high}$ to a negative $V_{low}$. The applied voltage causes ejection device 70 to eject a drop or drops 80 of liquid solder 44 in a manner controlled by the particular program in programmable controller 76. A displacement/voltage characteristic curve for an electrostrictive transducer is illustrated in FIG. 6. Since the induced elastic strain in the transducer is independent of the polarity of the field, the electrostrictive properties will not be affected by the elevated temperatures associated with molten solder or the like.

A bias voltage waveform may be employed to elevate the electric potential of the transducer to a linear portion on the deflection-voltage characteristic curve thereby linearizing the response of the electrostrictive transducer to the applied drive voltage.

As best illustrated in FIG. 6, the displacement of the ejection device 70 has a second order response to applied voltage and is a function of the square of the voltage. Changes in the magnitude and frequency of drive voltage applied to the ejection device 70 are used to change the sizes of the drops 80 of liquid solder 44 and the speed at which the drops are propelled from the ejection device 70.

The space surrounding the drop or drops 80 of liquid solder 44 between ejection device 70 and the target is preferably filled with relatively inert gas to eliminate oxygen from the path traveled by the drops 80. A gas source 62 provides a flow of inert gas into the space traveled by the drops 80 and the area where the drops 80 land on the target.

Operation of the apparatus 40 begins with placing solder in reservoir 42. In a preferred embodiment, the solder comprises a eutectic of at least two of the elements lead, tin, bismuth and indium. One such solder alloy is 63/37 tin/lead. Power is applied to heating element 46 to bring the temperature of the solder to its melting point and, after the solder is melted, a portion thereof is transferred through conduit 54 and valve 56 to the ejection chamber 52. The solder 44 in the ejection chamber 52 is maintained liquid by heating element 58. Ejection chamber 52 may be pressurized with relatively inert gas such as nitrogen or argon at a pressure of from about ten (10) to about thirty (30) psi, depending on whether a drop-on-demand ejection device or a charge-and-deflection device is used. The pressurized gas forces liquid solder 44 through filter 68 and into ejection device 70. Ejection device 70 is excited with signals from drive electronics 78 having a frequency typically less than about ten thousand (10,000) Hz.

In the presently preferred embodiment, the ejection device 70 comprises an electrostrictive transducer with a channel or bore therethrough which ejects liquid solder in response to an excitation signal. Electrostrictive transducers expand and contract mechanically when an excitation electric field is applied but, unlike piezoelectric materials, electrostrictive transducers have a second order response to the applied electric field which is independent of the polarity of the field (as illustrated in FIG. 6). Small changes in diameter (and therefore volume) of the solder microdroplet or ball 80 produced require only changes in the drive excitation voltage pulse. However, large changes require changes in the size of the orifice in the ejection device 70.

Figure 5:
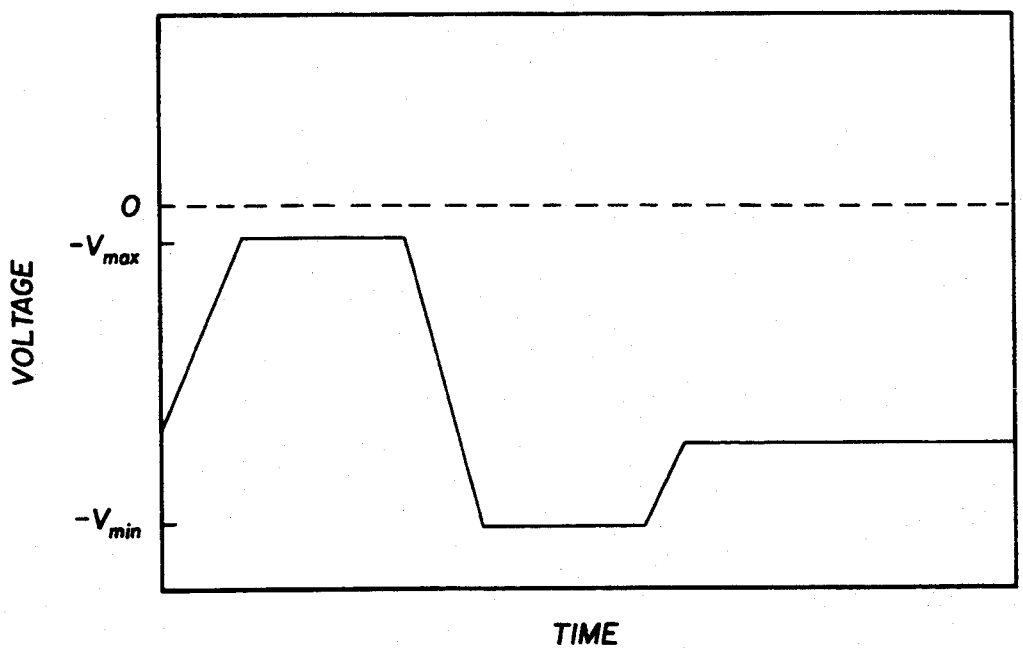
FIG. 5 is a graphic illustration of a bias drive waveform used to control an electrostrictive transducer in accordance with the invention.

In an alternative embodiment programmable controller 76 provides signals to drive electronics 78 and causes drive electronics to apply a biased voltage waveform such as illustrated in FIG. 5. This waveform comprises a bias voltage superimposed over a drive voltage waveform, thereby shifting the drive waveform along the voltage axis by the magnitude of the bias voltage. The bias voltage is preferably equal to a voltage which elevates the ejection device 70 to an electric potential where the elastic strain response of the transducer is linear, as illustrated in FIG. 6 and indicated by $V_{bias}$. Preferably, the bias voltage elevates the electric potential of the transducer to a mid-way point on the linear portion of the displacement/voltage characteristic curve. The drive voltage waveform is superimposed over the bias voltage resulting in a biased drive voltage waveform which varies from $V_{min}$ to $V_{max}$ about the elevated electric potential, inducing the transducer to respond to the excitation electric field in a linearized manner. By linearizing the elastic strain response of the transducer 70, greater control is achieved over the size and quantity of the microdroplets produced. Changes in the magnitude of the drive voltage waveform applied to the ejection device 70 are used to change the size of the microdroplets 80.

It will be readily recognized that electrostrictive materials with Curie temperatures appropriate for the intended use can be selected to optimize the benefits of the invention. Since electrostrictive transducers operate at or near their respective Curie temperatures, the selection of material of the transducer can be based on the particular elevated temperature at which the microdroplets are to be formed. Thus not only is the likelihood of degeneration of the transducer avoided, a much wider range of elevated temperatures is made available for formation of microdroplets with transducer ejection devices. Accordingly, although only preferred embodiments of the invention have been described and illustrated herein, it is to be recognized that modifications and variations may readily occur to those skilled in the art. It should also be recognized that although the invention has been described with particular reference to presently preferred embodiments, various modifications, alterations, variations, etc., may be resorted to without departing from the spirit and scope of the invention as defined by the appended claims.

What is claimed:

1. Apparatus for dispensing liquid at elevated temperatures comprising:
   (a) a chamber for holding and heating a liquid;
   (b) an ejection device comprising a transducer in communication with said chamber for receiving and ejecting the liquid in response to an applied electric field wherein said response is independent of the polarity of the field; and
   (c) a voltage source for applying an electric field to said transducer.

2. Apparatus as defined in claim 1 wherein said liquid at elevated temperatures includes molten solder and said apparatus further includes means for maintaining said solder liquid while in the apparatus.

3. Apparatus as defined in claim 1 further including means for pressurizing said chamber.

4. Apparatus as defined in claim 1 wherein said ejection device comprises an electrostrictive transducer having a second order response to said electric field.

5. Apparatus as defined in claim 4 wherein said voltage source provides a biased voltage waveform which raises said electrostrictive transducer to an elevated electric potential, thereby linearizing the response of said transducer to said electric field.

6. Apparatus for dispensing liquid at elevated temperatures comprising:
   (a) a reservoir for holding a liquid including means for maintaining said liquid at an elevated temperature;
   (b) an ejection chamber in communication with said reservoir including means for maintaining the liquid therein at an elevated temperature;
   (c) an ejection device comprising a transducer with a bore therethrough in communication with said ejection chamber for ejecting microdroplets of liquid in response to an applied electric field; and
   (d) a source for applying an electric field to said transducer which induces a second order elastic strain in said transducer independent of the polarity of the applied electric field to cause said transducer to eject a microdroplet of liquid.

7. Apparatus as defined in claim 6 wherein said liquid at elevated temperatures includes molten solder and said apparatus further includes means for maintaining said solder liquid while in the apparatus.

8. Apparatus as defined in claim 6 further including means for pressurizing said ejection chamber.

9. Apparatus as defined in claim 6 wherein said transducer is an electrostrictive transducer.

10. Apparatus for forming microdroplets of molten solder comprising:
    (a) a reservoir for holding molten solder;
    (b) means for maintaining said solder liquid in said reservoir;
    (c) an ejection device comprising an electrostrictive transducer in communication with said reservoir for receiving and ejecting said molten solder in response to an applied electric field; and
    (d) a voltage source for applying an excitation electric field to said transducer which causes a second order elastic strain in said electrostrictive transducer independent of the polarity of the electric field.

11. Apparatus as defined in claim 10 further including a source for applying a bias electric field which raises said electrostrictive transducer to an elevated potential, thereby linearizing the response of said electrostrictive transducer to said excitation electric field.

12. A method of forming microdroplets of a liquid at elevated temperatures comprising the steps of:
(a) maintaining a liquid in an ejection chamber;
(b) positioning an ejection device comprising a transducer with a bore therethrough with one end defining an orifice and the other end in communication with said ejection chamber;
(d) transferring liquid from said ejection chamber to said ejection device; and
(e) applying an electric field to said transducer which includes a second order elastic strain therein independent of the polarity of the electric field, thereby causing the ejection device to eject generally spherically-shaped droplets of said liquid from said orifice.

13. A method as set forth in claim 12 further including the step of linearizing said elastic strain in the ejection device by applying a bias electric field thereto.

14. A method as set forth in claim 12 further including the step of pressurizing said ejection device.

15. A method as set forth in claim 12 further including the step of varying the applied electric field to control the number and volume of microdroplets formed.

* * * * *